United States Patent
Morse et al.

(10) Patent No.: US 6,821,666 B2
(45) Date of Patent: Nov. 23, 2004

(54) METHOD OF FORMING A PACKAGE FOR MEMS-BASED FUEL CELL

(75) Inventors: Jeffrey D. Morse, Martinez, CA (US); Alan F. Jankowski, Livermore, CA (US)

(73) Assignee: The Regents of the Univerosity of California, Oakland, CA (US)

(*) Notice: Subject to any disclaimer, the term of this patent is extended or adjusted under 35 U.S.C. 154(b) by 521 days.

(21) Appl. No.: 09/967,145

(22) Filed: Sep. 28, 2001

(65) Prior Publication Data

US 2003/0064275 A1 Apr. 3, 2003

(51) Int. Cl.[7] .............................................. H01M 8/10
(52) U.S. Cl. ........................... 429/34; 429/30; 429/35; 429/36; 429/38; 429/39
(58) Field of Search .......................... 429/30, 34, 35, 429/36, 38, 39, 40, 44, 43

(56) References Cited

U.S. PATENT DOCUMENTS

| | | |
|---|---|---|
| 5,585,203 A | 12/1996 | Chikagawa et al. .......... 429/35 |
| 5,858,567 A | 1/1999 | Spear |
| 6,057,051 A | 5/2000 | Uchida et al. ................ 429/19 |
| 6,541,676 B1 | 4/2003 | Franz et al. |
| 6,569,553 B1 | 5/2003 | Koripella et al. |
| 2002/0068212 A1 * | 6/2002 | Osenar et al. ................ 429/36 |
| 2002/0081468 A1 | 6/2002 | Shioya |
| 2002/0094462 A1 | 7/2002 | Shioya et al. |
| 2002/0106540 A1 | 8/2002 | Shioya |
| 2003/0190508 A1 | 10/2003 | Takeyama et al. |

FOREIGN PATENT DOCUMENTS

| | | |
|---|---|---|
| WO | WO 94/15210 | 7/1994 |
| WO | WO 00/45457 | 8/2000 |

OTHER PUBLICATIONS

Abstract (Basic) FR 2300424 A Feb. 07, 1975.
Chicago Tribune Space–age power nears reality Jun. 06, 2000 Section 4.

\* cited by examiner

*Primary Examiner*—Bruce F. Bell
*Assistant Examiner*—Monique Wills
(74) *Attorney, Agent, or Firm*—Ann M. Lee; Alan H. Thompson; Eddie S. Scott

(57) ABSTRACT

A MEMS-based fuel cell package and method thereof is disclosed. The fuel cell package comprises seven layers: (1) a sub-package fuel reservoir interface layer, (2) an anode manifold support layer, (3) a fuel/anode manifold and resistive heater layer, (4) a Thick Film Microporous Flow Host Structure layer containing a fuel cell, (5) an air manifold layer, (6) a cathode manifold support structure layer, and (7) a cap. Fuel cell packages with more than one fuel cell are formed by positioning stacks of these layers in series and/or parallel. The fuel cell package materials such as a molded plastic or a ceramic green tape material can be patterned, aligned and stacked to form three dimensional microfluidic channels that provide electrical feedthroughs from various layers which are bonded together and mechanically support a MEMOS-based miniature fuel cell. The package incorporates resistive heating elements to control the temperature of the fuel cell stack. The package is fired to form a bond between the layers and one or more microporous flow host structures containing fuel cells are inserted within the Thick Film Microporous Flow Host Structure layer of the package.

14 Claims, 3 Drawing Sheets

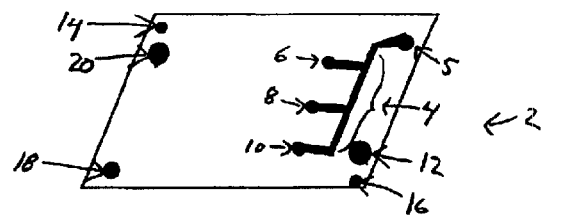
FIG. 1A
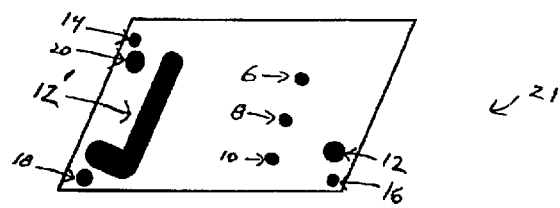
FIG. 1B
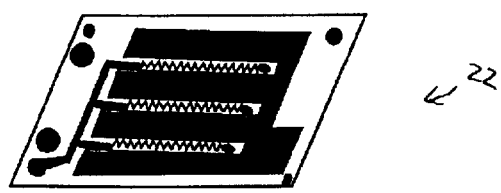
FIG. 1C
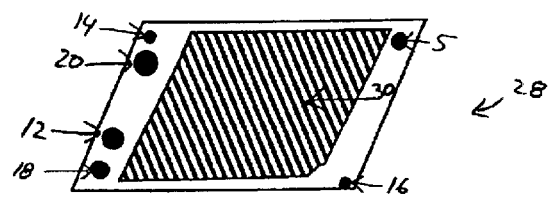
FIG. 1D
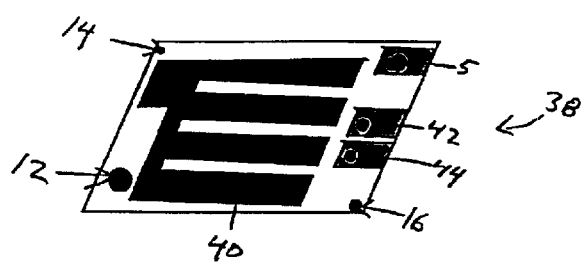
FIG. 1E
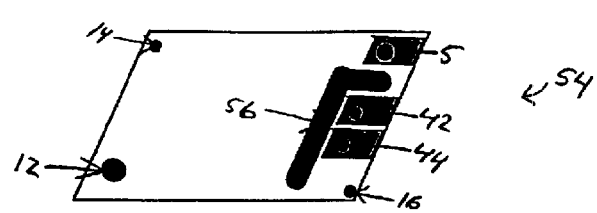
FIG. 1F
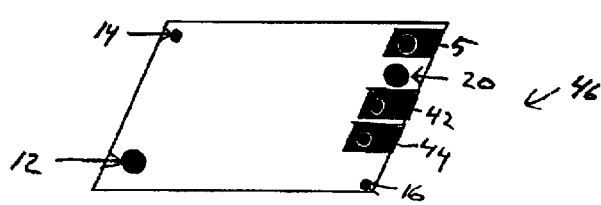
FIG. 1G

METHOD OF FORMING A PACKAGE FOR MEMS-BASED FUEL CELL

The United States Government has rights in this invention pursuant to Contract No. W-7405-ENG-48 between the United States Department of Energy and the University of California for the operation of Lawrence Livermore National Laboratory.

BACKGROUND OF THE INVENTION

Portable power sources of various types have been under development for many years. A serious need exists for portable power sources with significantly higher power density, longer operating lifetime, and lower cost. Present rechargeable and primary portable power sources have excessive weight, size, and cost with limited mission duration. For example, batteries covering power range from 1–200 Watts have specific energies ranging from 50–250 Whr/Kg, which represents two to three hours of operation for a variety of applications.

SUMMARY OF THE INVENTION

Aspects of the invention include a method comprising the steps of: patterning a package material into a preform layout; forming a package from the package material into a plurality of layers comprising at least a fuel reservoir interface layer, a layer containing a plurality of resistive heating elements, a microporous flow host structure layer containing a fuel cell, and a cap layer; and incorporating microchannels into the package.

Further aspects of the invention include a fuel cell package comprising: a first layer having a current input, a fuel inlet and a first plurality of electrical leads connected to the current input; a second layer having an anode manifold support structure, a fuel flow passage connecting to the fuel inlet and a fuel outlet; a third layer having a manifold support beam, a resistive heater support structure, a fuel flow passage, an air flow inlet connecting to an air flow passage, and a resistive heater connecting to each of the first plurality of electrical leads; a fourth layer having a fuel flow passage, an air flow passage, and a microporous flow host structure containing a thin film fuel cell formed from an electrolyte sandwiched between an anode and a cathode; a fifth layer having an air manifold connecting to the air flow passage in the fourth layer, a fuel flow passage, an anode electrical feedthrough, and a cathode electrical feedthrough; a sixth layer having an air flow passage connected to the air manifold in the fifth layer, a fuel flow passage, an anode electrical feedthrough and a cathode electrical feedthrough; and a seventh layer having an air flow passage, a fuel flow passage, an anode electrical feedthrough and a cathode electrical feedthrough; wherein, a resistive electrical feedthrough and an electrical feedthrough connected to a ground communicates through each of the layers.

Further aspects of the invention include a fuel cell package comprising: a first layer having a current input, a fuel inlet and a first plurality of electrical leads connected to the current input; a second layer having an anode manifold support structure, a fuel flow passage connecting to the fuel inlet and a fuel outlet; a third layer having a manifold support beam, a resistive heater support structure, a fuel flow passage, and a resistive heater connecting to each of the first plurality of electrical leads; a fourth layer having a fuel flow passage and a microporous flow host structure containing a thin film fuel cell formed from an electrolyte sandwiched between an anode and a cathode; a fifth layer having an air containing means to allow air to breath into the fuel cell package, a fuel flow passage, an anode electrical feedthrough, and a cathode electrical feedthrough; a sixth layer, a fuel flow passage, an anode electrical feedthrough and a cathode electrical feedthrough; and a seventh layer having a fuel flow passage, an anode electrical feedthrough and a cathode electrical feedthrough; wherein, a resistive electrical feedthrough and an electrical feedthrough connected to a ground communicates through each of the layers.

BRIEF DESCRIPTION OF THE DRAWINGS

FIG. 1A shows the first layer of a ceramic green tape fuel cell prior to assembly.

FIG. 1B shows the second layer of a ceramic green tape fuel cell prior to assembly.

FIG. 1C shows the third layer of a ceramic green tape fuel cell prior to assembly.

FIG. 1D shows the fourth layer of a ceramic green tape fuel cell prior to assembly.

FIG. 1E shows the fifth layer of a ceramic green tape fuel cell prior to assembly.

FIG. 1F shows the sixth layer of a ceramic green tape fuel cell prior to assembly.

FIG. 1G shows the seventh layer of a ceramic green tape fuel cell prior to assembly.

DETAILED DESCRIPTION

Figure 2:
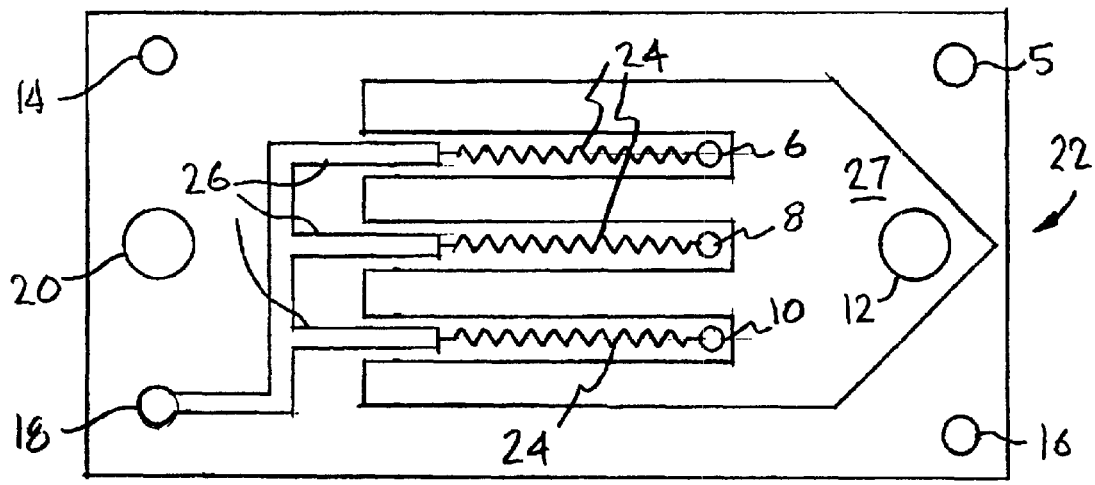
FIG. 2 is an illustration of the third layer, the fuel manifold and resistive heater layer, of a ceramic green tape fuel cell prior to assembly.

The invention herein describes a method of forming a package for a miniature fuel cell device. Illustrated in FIGS. 1A–1G is a preform layer of a seven layer fuel cell package. The package can be fabricated from a Low Temperature Co-fired Ceramic (LTCC), i.e., a ceramic green tape preform, such as Dupont 951 Green Tape, or a plastic or polymer preform, such as Dupont Kapton or Sylgard silicone. Methods to form the preform layers include laser cutting, injection molding, or extrusion molding of the ceramic or plastic.

Referring to FIG. 1A, the first layer of the package, a fuel reservoir interface 2, is fabricated from a ceramic green tape, molded ceramic, or a plastic preform. Fuel reservoir interface 2 comprises a resistive heater current input 4 having three electrical leads 6, 8, and 10, a fuel flow passage 12, a left side alignment pin 14, a right side alignment pin 16, and a grounded resistive heater feedthrough 18. Fuel reservoir interface 2 may also comprise an airflow via 20 if forced air is used. Resistive heater current input 4 can be connected to a load such as a battery or a super-capacitor, providing current flow to create heat in the resistor. Initial heating of the fuel cell package may also be introduced to the preform package through other techniques such as catalytically burning a hydrocarbon fuel-air mixture in a miniature isolated volume.

A second layer of the fuel cell package shown in FIG. 1B is an anode manifold support and fuel/air flow through layer 21 that is fabricated from a ceramic green tape, molded ceramic, or a plastic preform. Anode manifold support and fuel/air flow through layer 21 comprises electrical feedthrough 5, electrical leads 6, 8, and 10, fuel flow passage 12, left side alignment pin 14, right side alignment pin 16, and grounded resistive heater feedthrough 18. Anode manifold support and fuel/air flow through layer 21 may further comprise airflow via 20 if forced air is used.

In FIG. 1C, a third layer of the fuel cell package is a fuel/anode manifold and resistive heater layer 22 that is fabricated from a ceramic green tape, molded ceramic, or a plastic preform. Fuel/anode manifold and resistive heater layer 22 rests directly on top of the second layer, anode manifold support and fuel/air flow through layer 21, allowing the electrical leads (6,8,10) to make continuous electrical contact to the first layer. Referring now to FIG. 2, fuel manifold support and resistive heater layer 22 is shown in greater detail. This layer comprises electrical feedthrough 5, left side alignment pin 14, right side alignment pin 16, fuel flow passage 12, a resistive heater 24, electrical leads 6, 8, 10 connected to electrical input 4 through electrical feedthrough 5, manifold support beam 27 on which resistive heater 24 is formed, and three electrical leads 26 that are connected to ground through electrical feedthrough 18. Fuel/anode manifold and resistive heater layer 22 provides the mechanical support for the next layer, which includes the thick film microporous support structure. Additionally, the manifold support and resistive heater layer may optionally contain an air flow via 20 if forced air is used. Resistive heaters are formed along the top surface of the manifold support beam 27. The heaters are connected to a common feedthrough electrical lead that is grounded at one end, and at the other end to feedthroughs connected to a common input electrical feedthrough. The input feedthrough can be connected to a small battery that can power the heater. Manifold support beam 27 and resistive heater layer 22 provide physical support beams which support microporous flow host structure.

Referring FIG. 1D, a Thick Film Microporous Flow Host Structure (TFMPFHS) layer 28 forms the fourth layer of the fuel cell package. TFMPFHS layer 28 comprises electrical feedthrough 5, a microporous flow host structure (not shown), a fuel flow passage 12, left side alignment pin 14, right side alignment pin 16, and grounded resistive heater feedthrough 18. TFMPFHS layer 28 may further comprise an airflow via 20 if forced air is used. TFMPFHS layer 28 forms a drop-in template 30 where a thick film microporous flow host structure (not shown) is positioned. Additional approaches can form the TFMPHS in a continuous ceramic laminate structure rather than forming a dropin template. For this embodiment, the entirety of TFMPFHS layer 28 in FIG. 1 can be a thin film fuel cell formed on a ceramic or plastic laminate layer having a plurality of pores. The laminate can further include fuel and air feedthroughs as shown in FIG. 1, and the thin film fuel cell can be patterned in an appropriate template on the porous laminate layer so as to cover the center regions of pores, but not extend to the areas where the fuel and air flow channels are located.

Figure 3:
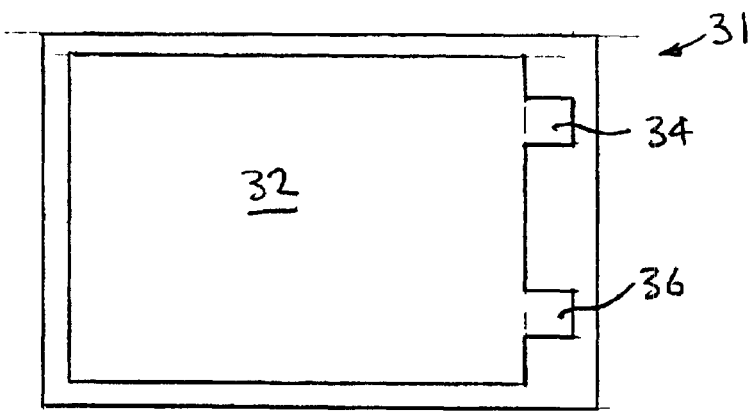
FIG. 3 is an illustration of a TFMPFHS (Thick Film Microporous Flow Host Structure) layer.

TFMPFHS layer 28 contains a thin film fuel cell at its top surface. Effective fuel cells are described elsewhere in pending U.S. patent application Ser. No. 88,911 which is hereby incorporated by reference. Referring to FIG. 3, a microporous flow host structure 31 comprises a thin film fuel cell 32, an anode contact 34, and a cathode contact 36. The fuel cell (not shown) includes a porous anode/catalyst layer, a dense electrolyte layer, and a porous cathode layer. The fuel cell can be either a proton exchange membrane (PEM) or solid oxide fuel cell (SOFC) materials structure.

For the PEM fuel cell, the anode can be a thin film of nickel or carbon on the porous host structure, followed by a platinum or platinum-ruthenium catalyst. This is followed by the electrolyte material, which can be Nafion. The cathode can have a platinum catalyst, followed by another carbon or Ni porous electrode. PEM fuel cells typically operate at temperatures between about 60° C. and about 90° C. Similarly, an SOFC structure can be formed by depositing a Ni anode on the porous host structure, followed by in anode catalyst, such as cerium oxide ($CeO_2$), after which is located a dense electrolyte layer, such as yttria-stablized zirconia (YSZ). The dense electrolyte layer is followed by a cathode catalyst, such as cerium oxide ($CeO_2$), which is then followed by a porous electrode material, such as silver or lanthanum strontium manganate. In the invention, fuel is allowed to flow between the support beams, allowing fuel to come into contact with a majority of the anode surface area by way of the micropore passages in the thick film host structure.

FIG. 1E illustrates an air manifold layer 38 that forms the fifth layer of the fuel cell package. Air manifold layer 38 comprises electrical feedthrough 5, an air manifold 40, left side alignment pin 14, right side alignment pin 16, an anode electrical feedthrough 42, a cathode electrical feedthrough 44 fuel flow passage 12, and air flow via 20 if forced air is used.

FIG. 1F illustrates an air manifold support layer 54 that forms the sixth layer of the fuel cell package. Air manifold support layer 54 comprises electrical feedthrough 5, an air flow via 20 communicating with the air manifold 56, left side alignment pin 14, right side alignment pin 16, anode electrical feedthrough 42, cathode electrical feedthrough 44 and fuel flow passage 12.

FIG. 1G illustrates a ceramic green tape or Plastic preform cap 46 that forms the seventh layer of the fuel cell package. Cap 46 aligns directly over air manifold layer 38 forming sealed bonds around electrical feedthroughs 5, 42, 44, fuel flow passage 12 and air flow via 20. Cap 46 can serve as the final layer in the fuel cell package. If the fuel cell package contains several fuel cells, cap 46 acts as a common layer, i.e., serving the dual function of capping off a first sub-package while simultaneously serving as a microfluidic interface and support structure for a second sub-package (not shown). Cap 46 comprises electrical feedthrough 5, left side alignment pin 14, right side alignment pin 16, anode electrical feedthrough 42, cathode electrical feedthrough 44. If connected to a second sub-package (not shown), Cap 46 contains airflow via 20 and fuel flow passage 12.

Figure 4A:
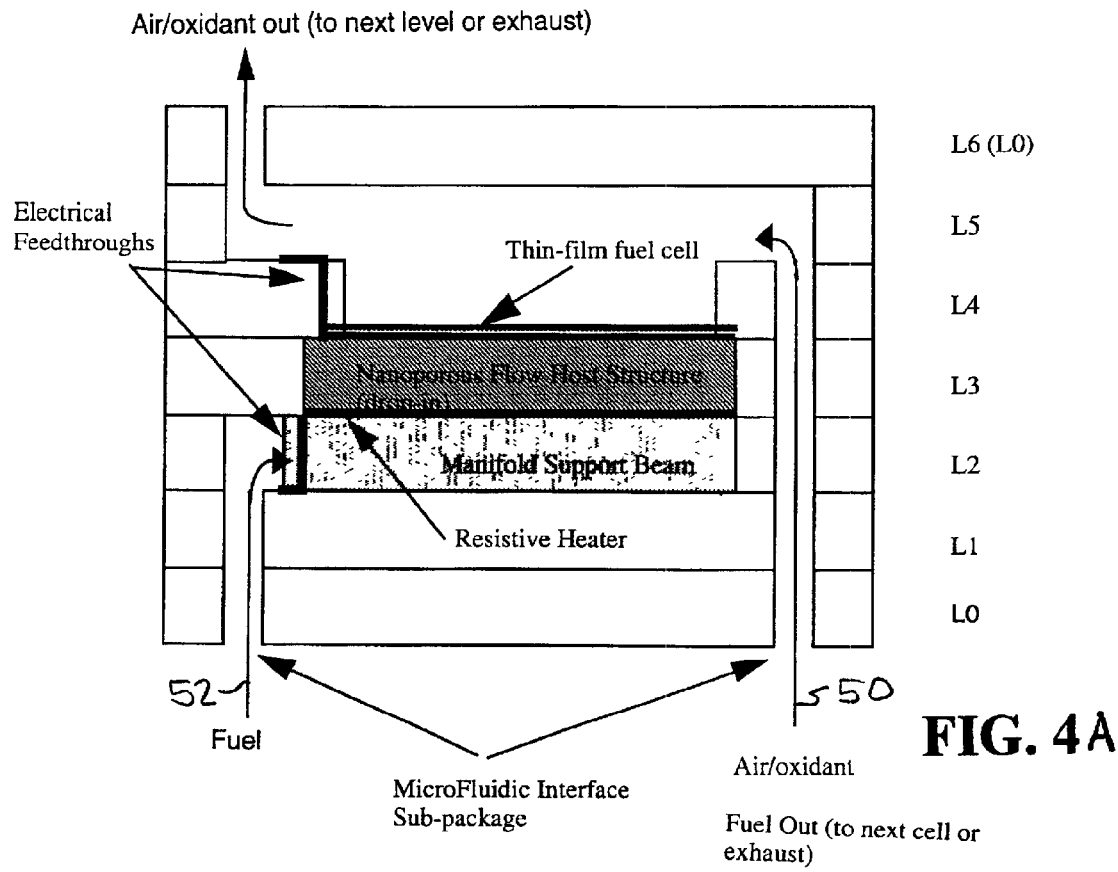
FIG. 4A is cross-sectional view of a microfluidic fuel cell package showing air flow path.
Figure 4B:
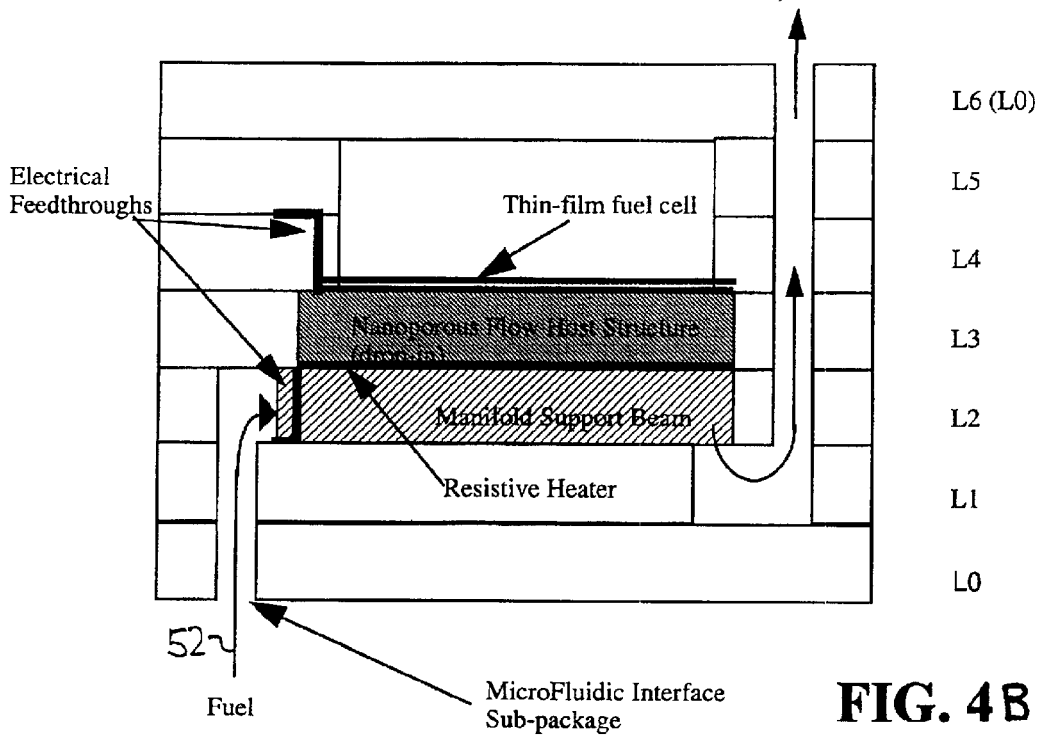
FIG. 4B is cross-sectional view of a microfluidic fuel cell package showing fuel flow path.

FIG. 4A shows a cross-sectional view of the first seven layers of a fuel cell package 48 showing the fuel flow path 52 in a cross flow configuration. FIG. 4B shows the first seven layers of a fuel cell package showing the air flow path 50 and the fuel flow path 52 in a cross flow configuration. Inlet flow passages for fuel, i.e. 52, and oxidant (air) sources, i.e. 50, are provided in the first layer which enable direct interface and design of heat transfer characteristics between the fuel cell package and a fuel storage reservoir (not shown) usually connected to the microfluidic fuel inlet using a valve, microvalve or other interconnect scheme.

Air flow 50 and air flow via 20 facilitate the use of forced air through the fuel cell package. Forced air is not necessary if an air "breathing" system is used. An air breathing system, for example, can contain perforations within the air manifold layer 38 that extends to the exterior of the package structure acting as a series of conduit that effectively provides air to the fuel cell.

The package material can comprise either a molded plastic or a ceramic green tape material. These materials are available in various thicknesses ranging from about 25 μm to about 1 mm (typically ranging from about 50 μm to about 250 μm) and can be shaped and patterned into arbitrary perform layouts using various etch or molding techniques. Etch techniques can, for example, include laser machining, wet etch or plasma etch. Extrusion molding and injection molding are examples of effective molding techniques. Metal interconnects can be patterned on these materials by any conventional means such as using screen print techniques.

A benefit of using ceramic green tapes for fuel cells is that the ceramic materials can be tailored to provide either high thermal conduction or high thermal isolation. This tailoring allows, for example, the center of the package to be concentrated at a high temperature while keeping the outer area cool, i.e., the operating temperature of the fuel cell can be between about 300° C. to about 650° C. while the fuel cell package remains cool enough to handle with a bare hand, i.e. less than about 55° C. Specific microfluidic cooling designs can be included in the laminated preform designs to provide counterflow heat exchange, thereby heating incoming cool gases with exhausted hot gas streams. Another benefit of using ceramic green tapes is that the ceramic preforms can have metal feedthroughs that enable electrical contact to conductive lead materials such as metal leads which can be made of, for example, silver or Platinum. The metal feedthroughs can extend vertically between the layers of the ceramic tape layers allowing several fuel cells to be stacked together in a three-dimensional layout. Another advantage for using ceramic green tapes is that resistive heating elements controlling the temperature of the electrode-electrolyte-electrode layers, i.e., the fuel cell stack, can be incorporated into the package. Additionally, microchannels that allow delivery of liquid fuel, and oxidant to specific sides of the fuel cell stack can also be incorporated into the package if ceramic green tape materials are used. In this embodiment, the inlet fuel passages can be coated with catalyst materials, such as Pt, Pt—Ru, Ni, or Cu—ZnO, which when heated assist in converting a liquid hydrocarbon fuel to hydrogen and other byproducts.

The microporous flow host structure can be silicon, ceramic, anodic alumina, plastic, or other similar material that contains a high density of porous flow channels formed therethrough, which allows direct flow of fuel to the porous anode structure of the fuel cell. The anode and cathode electrodes are patterned such that interconnect pads are positioned where they can make electrical contact to feedthroughs connected to the exterior of the package or the adjacent fuel cell positioned in the package.

Air manifold layer 38 provides the electrical feedthroughs for the anode, cathode, and resistor power input, as well as fuel and oxidant flow channels if necessary to connect to the adjacent level fuel cell in the stack. Air manifold layer 38 further provides a manifold to distribute the air to the cathode structure. In addition, air manifold layer 38 acts as a sealing means, such as, an o-ring seal around the top periphery of the microporous flow host structure that was inserted into TFMPFHS layer 28. A thin preform of Kapton tape or silicon dioxide tape can also be used to form a sealing bond beneath air manifold layer 38, or the forming properties of the plastic or ceramic green tape layers can be exploited to both bond and seal the microporous flow host structure/thin-film fuel cell into the package. Preferred methods and materials will depend on the desired operating temperature of the fuel cell package.

Ceramic green tape or plastic preform cap 46 is similar to the original sub-package microfluidic interface, except cap 46 contains electrical feedthroughs that enable simple fexibility when stacking and scaling the total number of fuel cells in the package.

The package is formed by aligning and contacting the package material layers. For instance, a green tape material contains a plastic binder materials which holds the thin sheets in form. The green tape structure is cofired in a furnace which removes the plastic binder and also forms a bond between the layers to thus, permanently connect the layers. Microporous flow host structure 30 is inserted within the layers as shown in FIG. 1. If any of the components of the microporous flow host structure cannot withstand the firing temperature of the ceramic tape, then the preform layers can be co-fired, i.e., all layers baked simultaneously, and assembled with the fuel cell using a low temperature adhesive to form the final bond and seal.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

What is claimed is:

1. A method comprising the steps of:

patterning a package material into a preform layout;

forming a package from said package material into a plurality of layers comprising at least a fuel reservoir interface layer, a layer containing a plurality of resistive heating elements, a microporous flow host structure layer containing a fuel cell, and a cap layer; and incorporating microchannels into the package.

2. The method of claim 1, wherein said plurality of layers further comprise an anode manifold support layer and a cathode manifold support layer.

3. The method of claim 1, further comprising the step of patterning metal interconnects between each of the layers using screen print techniques.

4. The method of claim 1, wherein the package material comprises molded plastic.

5. The method of claim 4, wherein the molded plastic is formed to have a thickness between about 25 μm and about 1 mm.

6. The method of claim 4, wherein the molded plastic is formed to have thickness between about 50 μm and about 250 μm.

7. The method of claim 1, wherein the package material comprises ceramic green tape materials.

8. The method of claim 7, wherein the ceramic green tape is formed to have a thickness between about 25 μm and about 1 mm.

9. The method of claim 7, wherein the ceramic green tape is formed to have a thickness between about 50 μm and about 250 μm.

10. The method of claim 1, further comprising the step of incorporating electrical feedthroughs that extend vertically between any two or more of the layers.

11. The method of claim 1, wherein the package material is patterned using etch techniques.

12. The method of claim 1, wherein the package material is patterned using molding techniques.

13. The method of claim 1, further comprising the step of incorporating an air flow manifold into the package.

14. The method of claim 1, further comprising the step of incorporating a fuel flow manifold into the package.

* * * * *